United States Patent
Tomoyasu et al.

(10) Patent No.: US 10,766,433 B2
(45) Date of Patent: Sep. 8, 2020

(54) VEHICLE DOOR GLASS RUN AND METHOD FOR ASSEMBLING THE SAME

(71) Applicant: Nishikawa Rubber Co., Ltd., Hiroshima (JP)

(72) Inventors: Shingo Tomoyasu, Hiroshima (JP); Tomonori Miyata, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 106 days.

(21) Appl. No.: 16/167,694

(22) Filed: Oct. 23, 2018

(65) Prior Publication Data

US 2019/0118732 A1 Apr. 25, 2019

(30) Foreign Application Priority Data

Oct. 25, 2017 (JP) ................................ 2017-206105
Oct. 19, 2018 (JP) ................................ 2018-197136

(51) Int. Cl.

| *B60R 13/04* | (2006.01) |
|---|---|
| *B60J 10/33* | (2016.01) |
| *B60J 10/16* | (2016.01) |
| *B60J 10/76* | (2016.01) |
| *B60J 10/265* | (2016.01) |

(52) U.S. Cl.
CPC ............... *B60R 13/04* (2013.01); *B60J 10/16* (2016.02); *B60J 10/265* (2016.02); *B60J 10/33* (2016.02); *B60J 10/76* (2016.02)

(58) Field of Classification Search
CPC ......... B60R 13/04; B60J 10/16; B60J 10/265; B60J 10/33; B60J 10/76
See application file for complete search history.

(56) References Cited

U.S. PATENT DOCUMENTS

| 6,199,941 B1 * | 3/2001 | Takahara ................ B60R 13/02 138/121 |
| 2018/0043673 A1 * | 2/2018 | Mouser ................... B32B 37/12 |
| 2019/0176602 A1 * | 6/2019 | Takeda ..................... B60J 10/88 |

FOREIGN PATENT DOCUMENTS

DE 102014202802 A1 2/2014

* cited by examiner

*Primary Examiner* — Lori L Lyjak
(74) *Attorney, Agent, or Firm* — Renner, Otto, Boisselle & Sklar, LLP

(57) ABSTRACT

A trim strip has upper and lower trim-strip-side mating portions. A glass run body has, at its exterior part, body-side mating portions and an upper contacting portion contacting an upper part of an exterior surface of the trim strip. The upper contacting portion has a portion contacting the trim strip, and the portion is provided with a coating. The coating is formed of an elastic material reducing the sliding resistance to the trim strip.

10 Claims, 7 Drawing Sheets

EXTERIOR OF VEHICLE CABIN ← → INTERIOR OF VEHICLE CABIN

EXTERIOR OF VEHICLE CABIN ← → INTERIOR OF VEHICLE CABIN

EXTERIOR OF VEHICLE CABIN ←    → INTERIOR OF VEHICLE CABIN

EXTERIOR OF VEHICLE CABIN ←       → INTERIOR OF VEHICLE CABIN

VEHICLE DOOR GLASS RUN AND METHOD FOR ASSEMBLING THE SAME

CROSS-REFERENCE TO RELATED APPLICATION

This application claims priority to Japanese Patent Application No. 2017-206105 filed on Oct. 25, 2017, the entire invention of which is incorporated by reference herein.

BACKGROUND ART

The present disclosure relates to a glass run mounted on a window frame of a vehicle door and a method for assembling the glass run.

There are various types of vehicle side doors, one of which has a window frame holding a peripheral portion of a window glass. A door having such a window frame is provided with a glass run for sealing a gap between the window frame and the window glass (see, e.g., German Patent Application Publication No. 102014202802).

The glass run described in German Patent Application Publication No. 102014202802 is assembled on a window frame from the exterior of a vehicle cabin. Such a glass run configured to be assembled on the window frame from the exterior of the cabin, as described in German Patent Application No. 102014202802, is called a "hiding type" glass run, which may sometimes be adopted due to, e.g., design requirements of a vehicle.

The glass run described in German Patent Application Publication No. 102014202802 includes a glass run provided with an insertion groove into which a glass run mount, extending outwardly from an upper part of the window frame, is inserted, and a trim strip assembled on a part of the glass run body in the exterior of the vehicle cabin (hereinafter simply referred to as "an exterior part of the glass run body"). The trim strip is a member constituting a part of the design of the vehicle. The trim strip is usually formed of a hard material such as stainless and aluminum and extends long in a front-rear direction of the vehicle along the glass run body. The trim strip has, at its upper and lower parts, upper and lower mating portions bent toward the interior of the cabin. The glass run body has, at its exterior parts, portions mating with the upper and lower mating portions of the trim strip, and formed in the shape of a rail extending in the front-rear direction of the vehicle. Further, the glass run body further has, at its upper part of the exterior part, a contacting portion contacting an upper part of the trim strip assembled on the glass run body.

SUMMARY

German Patent Application Publication No. 102014202802 discloses in FIGS. 1 to 3 illustrate a method for assembling a trim strip on a glass run body, the glass run body having a rail portion formed of a relatively soft material and made in the form of a lip, in a manner pushing the trim strip into the glass run body from the exterior to the interior of the vehicle cabin, i.e., in the sectional direction. This configuration and this method for assembly facilitate assembly of the trim strip because the rail portion in the form of a lip is easily bent and deformed. However, the trim strip may be accidentally detached from the glass run body after being assembled.

For assembly of a glass run having a trim strip as described in German Patent Application Publication No. 102014202802, such a method is therefore conceivable that forms a rail portion of a glass run in the exterior of the vehicle cabin using a relatively hard material, mates upper and lower mating portions of a trim strip with the rail portion by sliding the trim strip along the rail portion in the longitudinal direction (the front-rear direction of the vehicle), and positions the trim strip and the glass run body in the front-rear direction of the vehicle.

However, the glass run body has, at its upper exterior part, a contacting portion contacting an upper part of the assembled trim strip and formed of, for example, a soft elastomer similar to the glass run body. Thus, this structure increases a friction force generated between the trim strip and the contacting portion in sliding the trim strip in the assembly process. Assembling the trim strip therefore requires a large force, which makes manual assembly of the trim strip by a worker more difficult.

As a solution, the contacting portion contacting the upper part of the trim strip may be shrunk or removed. This method, however, creates a gap between the glass run body and the upper part of the trim strip, resulting in deterioration of appearance.

As the means for assembling a trim strip without shrinking or removing the contacting portion, a machine for trim strip assembly may be introduced to achieve mechanized trim strip assembly by machine. Such a machine is less versatile and thus quite expensive. In addition, fixing and installation of such a large machine are laborious, and introduction of the machine is therefore difficult.

The present disclosure is conceived in view of the above problems, and attempts to allow a worker to manually assemble a trim strip on a glass run body without using any machine for trim strip assembly, and to minimize a gap between the glass run body and the trim strip after the assembly, thereby improving the appearance.

In order to achieve the above attempts, a first aspect of the present disclosure relates to a vehicle door glass run, which is mounted on a window frame extending in a manner defining a window opening of a vehicle door from an exterior of a cabin, and seals between the window frame and a window glass. The vehicle door glass run includes: a glass run body having an insertion groove into which a glass run mount extending outward from an upper part of the window frame is inserted; and a trim strip assembled on an exterior part of the glass run body and extending in a front-rear direction of a vehicle, wherein upper and lower parts of the trim strip are respectively provided with upper and lower trim-strip-side mating portions extending in a front-rear direction of the vehicle and configured to mate with the exterior part of the glass run body, the exterior part of the glass run body is provided with body-side mating portions and an upper contacting portion, the body-side mating portions extending in the front-rear direction of the vehicle and being configured to mate with the upper and lower trim-strip-side mating portions, the upper contacting portion being formed of an elastic material and being configured to contact the upper trim-strip-side mating portion of the trim strip, and the upper contacting portion has a portion contacting the trim strip and provided with a coating, and the coating has a kinetic friction coefficient, to the trim strip, lower than an elastic material forming a covered portion of the upper contacting portion by the coating.

According to this configuration, when the trim strip is assembled on the glass run body, the upper and lower trim-strip-side mating portions of the trim strip are mated, from one ends in the front-rear direction of the vehicle, with one ends of the body-side mating portions of the glass run body. Then, the trim strip is slid along the glass run body in the front-rear direction of the vehicle. At that time, the upper contacting portion of the glass run body has a coating having a kinetic friction coefficient, to the trim strip, lower than the upper contacting portion. This reduces the sliding resistance when the trim strip contacts the coating. This configuration facilitates manual assembly of the trim strip on the glass run body by a worker and thus makes it unnecessary to introduce any machine for trim strip assembly.

In a second aspect of the present disclosure, an upper part of the exterior part of the glass run body is provided with an upper sealing lip projecting upward and configured to be bent outward and obliquely downward from the cabin upon contact with a vehicle body, and the upper sealing lip has a base end having an exterior part provided with the upper contacting portion projecting outward.

According to this configuration, when the vehicle door is closed, the upper sealing lip of the glass run body contacts a vehicle body and is elastically deformed so as to bend toward the exterior of the cabin, thereby sealing between the window frame and the vehicle body. At that time, the upper sealing lip has a thick base end having an exterior part provided with the upper contacting portion, and thus, is slightly displaced toward the exterior of the cabin due to the deformation of the upper sealing lip. This allows the upper contacting portion to further closely contact the upper part of the exterior surface of the trim strip.

In a third aspect of the present disclosure, the exterior part of the glass run body is provided with a lower contacting portion located below and apart from the upper contacting portion, the lower contacting portion being formed of an elastic material and being configured to contact the lower trim-strip-side mating portion of the trim strip, and the lower contacting portion has a portion contacting the trim strip and provided with a coating, and the coating has a kinetic friction coefficient, to the trim strip, lower than an elastic material forming a covered portion of the lower contacting portion by the coating.

According to this configuration, the lower contacting portion of the glass run body contacts the lower part of the exterior surface of the trim strip, eliminating a gap between the lower part of the trim strip and the glass run body. At that time, the lower contacting portion of the glass run body has a coating having a kinetic friction coefficient, to the trim strip, lower than the lower contacting portion. This reduces the sliding resistance when the trim strip slides on the coating. This configuration makes assembly of the trim strip on the glass run body easier.

In a fourth aspect of the present disclosure, the coating has a thickness of equal to or greater than 0.005 mm and equal to or smaller than 0.5 mm.

According to this configuration, the thickness of the coating of equal to or more than 0.005 mm can sufficiently reduce the sliding resistance to the trim strip. The thickness of the coating of equal to or less than 0.5 mm can reduce a decrease in flexibility of the upper contacting portion due to the presence of the coating. The thickness of the coating in the lower contacting portion can be set in the same or similar manner.

In a fifth aspect of the present disclosure, the glass run body includes an upper plate portion extending along an upper surface of the glass run mount, a lower plate portion extending along a lower surface of the glass run mount, and an exterior plate portion extending from an exterior end of the upper plate portion to an exterior end of the lower plate portion, the insertion groove being formed between the upper plate portion and the lower plate portion, and the upper plate portion, the lower plate portion, and the exterior plate portion are formed of a high-stiffness material having a flexural modulus ranging from 2000 MPa to 5000 MPa.

According to this configuration, the upper plate portion, the lower plate portion, and the exterior plate portion each have high stiffness. This increases the anchoring strength of the glass run body to the glass run mount.

In a sixth aspect of the present disclosure, the body-side mating portion is integrally formed with the exterior plate portion.

This configuration increases the anchoring strength of the trim strip to the glass run body.

In a seventh aspect of the present disclosure, the coating has a kinetic friction coefficient, to the trim strip, of 0.5 or less.

This configuration sufficiently reduces the sliding resistance to the trim strip.

In an eighth aspect of the present disclosure, the exterior part of the glass run body is provided with a projection projecting toward the exterior of the cabin and configured to contact an interior surface of the trim strip.

This configuration reduces, when the trim strip is slid on the glass run body, a contact area between the interior surface of the trim strip and the glass run body.

A ninth aspect of the present disclosure relates to a method of assembling a vehicle door glass run, which is mounted on a window frame extending in a manner defining a window opening of a vehicle door from an exterior of a cabin, and seals between the window frame and a window glass. The method includes: preparing a glass run body having an insertion groove into which a glass run mount extending outward from an upper part of the window frame is inserted, and a trim strip assembled on an exterior part of the glass run body and extending in a front-rear direction of a vehicle; providing upper and lower parts of the trim strip with upper and lower trim-strip-side mating portions extending in a front-rear direction of the vehicle and configured to mate with the exterior part of the glass run body; providing the exterior part of the glass run body with body-side mating portions extending in the front-rear direction of the vehicle and configured to mate with the upper and lower trim-strip-side mating portions, providing the exterior part of the glass run body with an upper contacting portion formed of an elastic material and configured to contact the upper trim-strip-side mating portion formed on an exterior surface of the trim strip, and providing the upper contacting portion with a portion contacting the trim strip and providing the portion with a coating; having the coating have a kinetic friction coefficient, to the trim strip, lower than an elastic material forming a covered portion of the upper contacting portion by the coating; and assembling the trim strip on the glass run body by mating the upper and lower trim-strip-side mating portions of the trim strip, from one ends of the upper and lower trim-strip-side mating portions of the trim strip, in a longitudinal direction, with one ends of the body-side mating portions of the glass run body in the longitudinal direction, and then, sliding the trim strip along the glass run body in the longitudinal direction.

In a tenth aspect of the present disclosure, the trim strip is preliminarily curvedly shaped to fit a shape of the upper part of the window frame, and the glass run body is preliminarily linearly shaped, and then, the assembling is performed.

According to the first aspect of the present disclosure, the upper and lower trim-strip-side mating portions are provided to the trim strip so as to extend in the front-rear direction of the vehicle, the body-side mating portions mating with the upper and lower trim-strip-side mating portions are provided to the exterior part of the glass run body so as to extend in the front-rear direction of the vehicle, an upper contacting portion is formed of an elastic material, and is configured to contact the upper trim-strip-side mating portion of the trim strip, the upper contacting portion has a portion contacting the trim strip and provided with a coating, and the coating has a kinetic friction coefficient to the trim strip lower than an elastic material forming a covered portion of the upper contacting portion by the coating. This configuration facilitates manual assembly of the trim strip on the glass run body by a worker without using any machine for trim strip assembly.

According to the second aspect of the present disclosure, an upper part of the exterior part of the glass run body is provided with the upper sealing lip, and the upper sealing lip has a base end having an exterior part provided with the upper contacting portion. This allows the upper contacting portion to further closely contact an upper part of the exterior surface of the trim strip with the vehicle door closed, improving appearance.

According to the third aspect of the present disclosure, the exterior part of the glass run body is provided with a lower contacting portion formed of an elastic material and configured to contact a lower part of the exterior surface of the trim strip. This eliminates a gap between the lower part of the trim strip and the glass run body to improve the appearance. In this configuration, the lower contacting portion has a portion contacting the trim strip, and the portion is provided with a coating having a kinetic friction coefficient to the trim strip lower than the lower contacting portion. This facilitates manual assembly of the trim strip on the glass run body by a worker.

According to the fourth aspect of the present disclosure, the thickness of the coating of equal to or more than 0.005 mm can sufficiently reduce the sliding resistance to the trim strip. The thickness of the coating of equal to or less than 0.5 mm can reduce a decrease in flexibility of the upper contacting portion due to the presence of the coating.

The fifth aspect of the present disclosure allows for increasing the anchoring strength of the glass run body to the glass run mount.

The sixth aspect of the present disclosure allows for increasing the anchoring strength of the trim strip to the glass run body.

The seventh aspect of the present disclosure can sufficiently reduce the sliding resistance to the trim strip, further facilitating manual assembly of the trim strip on the glass run body by a worker.

The eighth aspect of the present disclosure can further reduce a force needed for assembly of the trim strip on the glass run body.

The ninth aspect of the present disclosure facilitates manual assembly of the trim strip on the glass run body by a worker without using any machine for trim strip assembly.

According to the tenth aspect of the present disclosure, the trim strip is preliminarily curvedly shaped, and the glass run body is preliminarily linearly shaped, reducing the sliding resistance. This can reduce a force needed for assembly of the trim strip on the glass run body.

DETAILED DESCRIPTION

Embodiments of the present disclosure will now be described in detail with reference to the drawings. Note that the description of the following beneficial embodiments is only an example in nature, and is not intended to limit the scope, application or uses of the present disclosure.

First Embodiment

Figure 1:
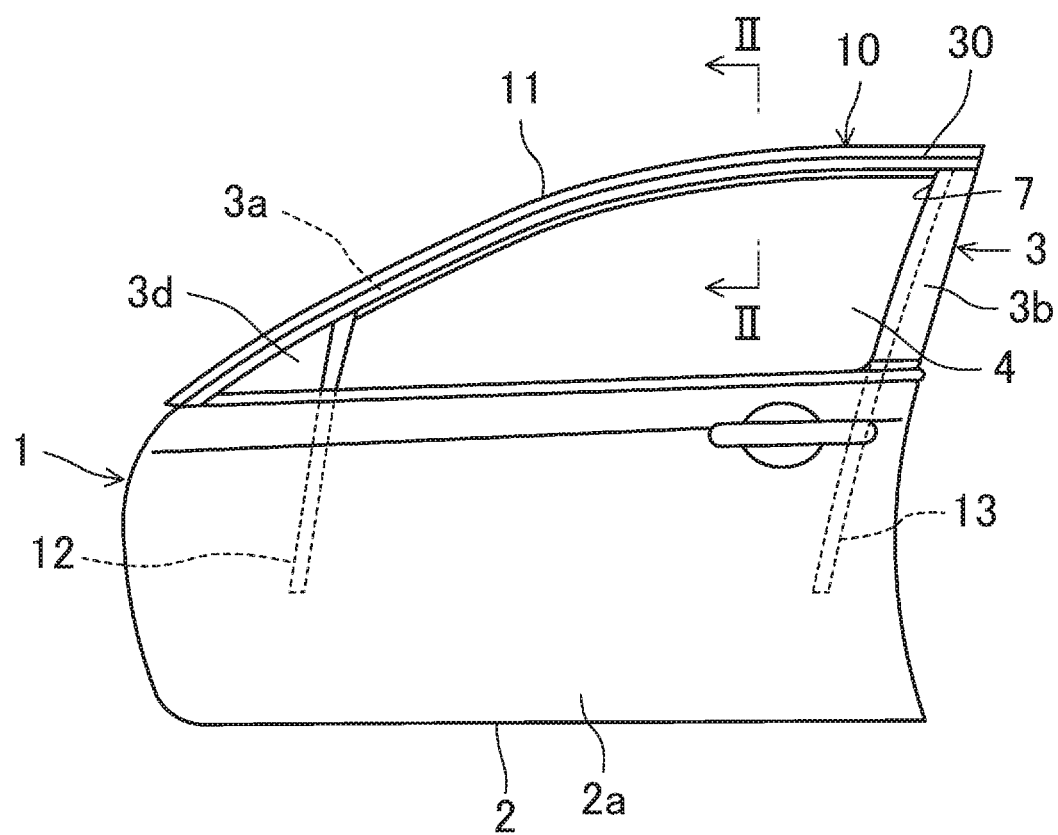
FIG. 1 is a left side view of a vehicle door on which a glass run is assembled according to a first embodiment of the present disclosure.

FIG. 1 is a side view of a left front door (a vehicle door) 1 having a left front door glass run (a vehicle door glass run) 10 according to a first embodiment of the present disclosure, viewed from the exterior (left side) of a vehicle cabin (hereinafter referred to as "the cabin"). The left front door 1 is installed to the left front side of a vehicle (not illustrated), and opens and closes an opening (not illustrated) formed in the left front side of the vehicle. A right front door (not illustrated) and the left front door are symmetrically equipped. The vehicle door glass run according to the present disclosure is mountable to the right and left rear doors (not illustrated).

In the description of this embodiment, the side closer to the front of the vehicle is simply referred to as "front," and the side closer to the rear of the vehicle is simply referred to as "rear." Further, a part of a component located in or closer to the cabin is simply referred to as "an interior part of a component," and a part of a component located away from the cabin is simply referred to as "an exterior part of a component." The direction toward the cabin is simply referred to as "inward," and the direction away from the cabin is simply referred to as "outward."

Configuration for Door

As illustrated in FIG. 1, the left front door 1 includes a door body 2 that is almost a substantially lower half of the left front door 1 and a window frame 3 that is almost a substantially upper half of the left front door 1. Although not illustrated, a front end of the door body 2 is attached on a pillar of a vehicle body via hinges pivoting about an axis extending in a vertical direction. The door body 2 includes an inner panel (not shown) and an outer panel 2a which are made of a steel sheet or any other suitable material, and is configured to house a window glass 4 which is movable up and down, and a lifting apparatus (not shown) which allows the window glass 4 to move up and down.

Figure 2:
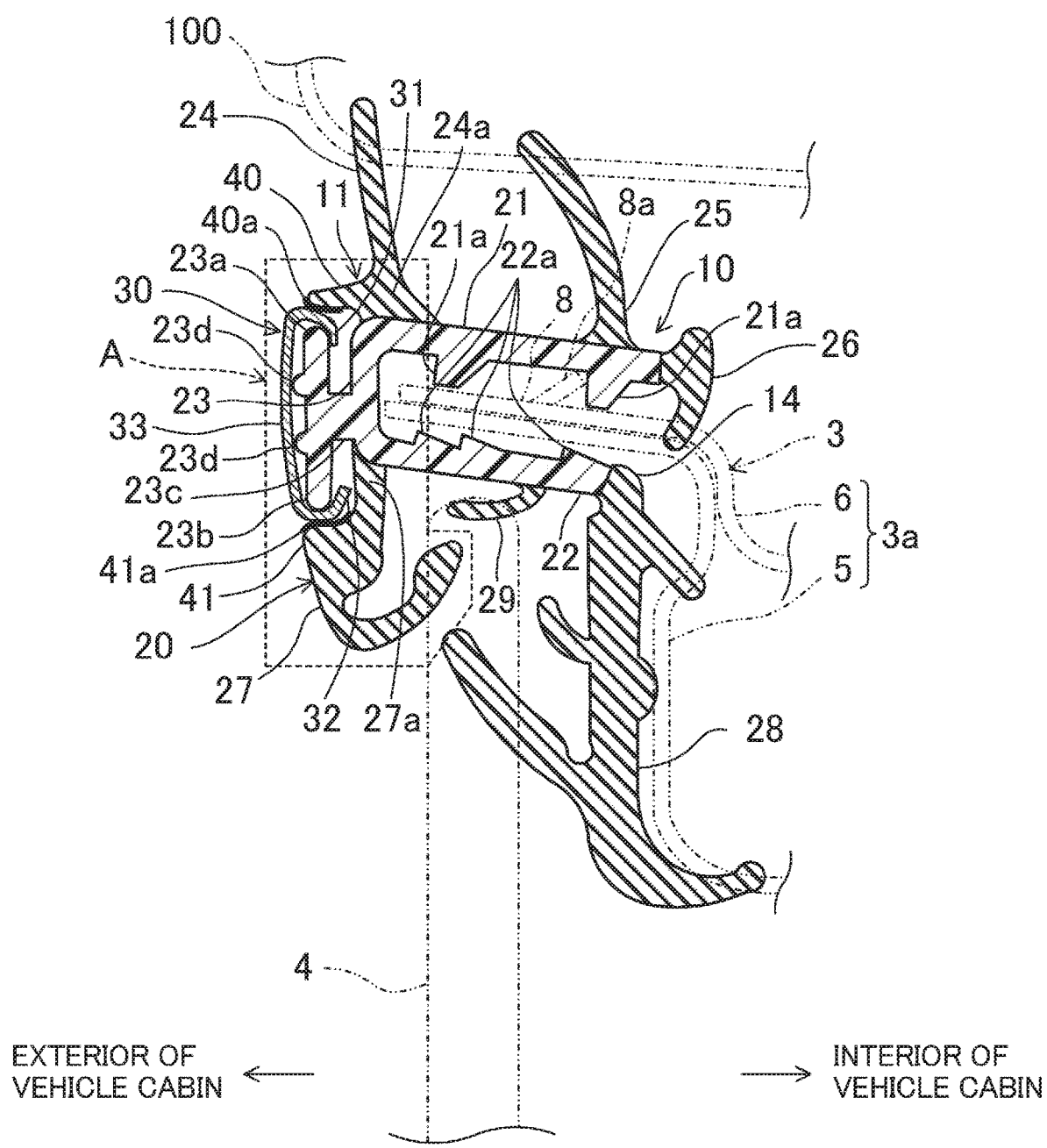
FIG. 2 is a cross-sectional view taken along line II-II of FIG. 1.

The window frame 3 functions as a sash holding a peripheral portion of the window glass 4, and extends to define a window opening 7. The window glass 4 is configured to cover or uncover the window opening 7 defined by the window frame 3. The window frame 3 of this embodiment is comprised of a combination of an outer panel 5 and an inner panel 6, both of which are press-formed from a steel sheet or any other suitable material, as shown in FIG. 2. Note that the window frame 3 may be obtained by, for example, roll forming.

As illustrated in FIG. 1, the window frame 3 is comprised of an upper frame portion 3a and a rear frame portion 3b.

The upper frame portion 3a extends rearward from a front part of an upper edge of the door body 2, and is curved such that the upper frame portion 3a extends upward toward the rear end of the door body 2. The rear frame portion 3b extends upward from a rear portion of the upper edge of the door body 2. An upper end of the rear frame portion 3b and a rear end of the upper frame portion 3a are connected together to form the window frame 3.

The shape of the window frame 3 is not limited to the illustrated one. Alternatively, the window frame 3 may be generally curved upward, and the position of a curved portion and a curvature of inclination angle of the upper frame 3a may be set in conformance to the roof shape of the vehicle body. The window frame 3 may further have a front frame portion (not illustrated) vertically extending at the front part of the window frame 3. The front of the window frame 3 is provided with a door mirror mount 3d to which a door mirror (not illustrated) is attached.

As shown in FIG. 2, the upper frame portion 3a of the window frame 3 is provided with a plate-shaped, glass run mount 8 protruding toward the exterior of the cabin. The glass run mount 8 is comprised of exterior parts of the outer panel 5 and the inner panel 6. That is to way, the exterior part of the outer panel 5 extends substantially horizontally, and continuously extends in the front-rear direction of the vehicle (hereinafter referred to as "the front-rear direction"). Likewise, the exterior part of the inner panel 6 extends substantially horizontally, and continuously extends in the front-rear direction. The lower surface of the exterior part of the inner panel 6 is placed on the upper surface of the exterior part of the outer panel 5 to form the glass run mount 8. The glass run mount 8 can be constituted by either one or both of the outer panel 5 and the inner panel 6.

Configuration of Glass Run

A left front door glass run 10 is a so-called "hiding type" glass run which covers at least an exterior part of the window frame 3. As will be described in detail later, the left front door glass run 10 is assembled on the upper frame portion 3a from the exterior of the cabin, and functions as a seal which seals a gap between the window frame 3 and the window glass 4. The left front door glass run 10 further covers the glass run mount 8 that is the exterior part of the window frame 3.

As illustrated in FIG. 1, the left front door glass run 10 includes an upper glass run portion 11, a front vertical glass run portion 12, and a rear vertical glass run portion 13. The upper glass run portion 11, the front vertical glass run portion 12, and the rear vertical glass run portion 13 are integrally formed together. The upper glass run portion 11 extends in the front-rear direction along the upper frame portion 3a that is the upper part of the window frame 3, and is curved along the upper frame portion 3a in the state assembled on the glass run mount 8, and is located higher toward the rear end.

The front vertical glass run portion 12 extends downward from the front end of the upper glass run portion 11. The rear vertical glass run portion 13 extends downward from the rear end of the upper glass run portion 11. The front vertical glass run portion 12 and the rear vertical glass run portion 13 extend to the interior of the door body 2, and vertically guide the front part and the rear part of the window glass 4.

As illustrated in FIG. 2, the left front door glass run 10 includes a glass run body 20 and a trim strip 30. The glass run body 20 has an insertion groove 14 into which the glass run mount 8 is inserted. The trim strip 30 is assembled on the exterior part of the glass run body 20 and extends in the front-rear direction. The trim strip 30 is assembled only on the glass run body 20 forming the upper glass run portion 11 and is assembled on neither the front vertical glass run portion 12 nor the rear vertical glass run portion 13.

The glass run body 20 includes an upper plate portion 21, a lower plate portion 22, and an exterior plate portion 23 away from the cabin. The upper plate portion 21 extends along the upper surface of the glass run mount 8. The lower plate portion 22 extends along the lower surface of the glass run mount 8. The exterior plate portion 23 vertically extends from the exterior end, away from the cabin, of the upper plate portion 21 to the exterior end, away from the cabin, of the lower plate portion 22. The upper plate portion 21, the lower plate portion 22, and the exterior plate portion 23 are integrally formed together by extrusion.

The insertion groove 14 into which the glass run mount 8 is inserted is formed between the upper plate portion 21 and the lower plate portion 22. The insertion groove 14 opens in a gap between the interior end, closer to the cabin, of the upper plate portion 21 and the interior end, closer to the cabin, of the lower plate portion 22, and extends in the front-rear direction. The exterior plate portion 23 constitutes a bottom of the insertion groove 14. With the glass run body 20 mounted on the glass run mount 8, the depth of the insertion groove 14 and the dimension (dimension in the lateral direction) of the glass run mount 8 in an inward-outward direction of the cabin are determined such that the exterior end of the glass run mount 8 reaches near the bottom of the insertion groove 14.

The upper plate portion 21, the lower plate portion 22, and the exterior plate portion 23 are formed of a high-stiffness material having a flexural modulus ranging from 2000 MPa to 5000 MPa. Examples of such a high-stiffness material include hard resin (such as polypropylene with talc or glass fiber mixed), but is not limited thereto. Instead of hard resin, other materials and various composite materials are also applicable. Use of the above-described high-stiffness material for the upper plate portion 21, the lower plate portion 22, and the exterior plate portion 23 can increase the stiffness of the upper plate portion 21, the lower plate portion 22, and the exterior plate portion 23, and particularly prevent a wide separation between the upper plate portion 21 and the lower plate portion 22. This structure allows the upper plate portion 21 and the lower plate portion 22 to firmly holding the glass run mount 8 in the thickness direction with the glass run body 20 mounted on the glass run mount 8. This can substantially prevent the left front door glass run 10 from being accidentally detached from the glass run mount 8 and sufficiently increase the anchoring strength of the left front door glass run 10.

The lower surface of the upper plate portion 21 has a plurality of upper engaging projections 21a projecting downward and formed at certain intervals in the inward-outward direction of the cabin. The upper engaging projection 21a can be designed so as to have its lower end be in contact with the upper surface of the glass run mount 8. The upper engaging projection 21a located in the interior of the cabin abuts on, and engages with, a raised portion 8a, which projects upward from the upper surface of the glass run mount 8, from the exterior of the cabin. As a result, the left front door glass run 10 becomes less likely to be detached from the glass run mount 8.

The upper surface of the lower plate portion 22 has a plurality of lower engaging projections 22a projecting upward and formed at certain intervals in the inward-outward direction of the cabin. The lower engaging projection 22a can be designed so as to have its upper end be in contact with the lower surface of the glass run mount 8. The vertical separation distance between the upper end of the lower engaging projection 22a and the lower end of the upper engaging projection 21a may be as large as the thickness of the glass run mount 8 or may be slightly larger than the thickness of the glass run mount 8 for easier assembly.

The glass run body 20 is provided with an upper sealing lip 24 at an upper part of its exterior part. The upper sealing lip 24 projects upward and is designed to be bent toward the exterior of the cabin, upon contact with a vehicle body 100. A base end of the upper sealing lip 24 is fixed to, and is integrated with, an exterior part of the upper surface of the upper plate portion 21. When the upper sealing lip 24 is not in contact with the vehicle body 100, i.e., when the left front door 1 is open, the upper sealing lip 24 is projecting substantially straight upward as illustrated in FIG. 2. When the upper sealing lip 24 is in contact with the vehicle body 100, i.e., when the left front door 1 is closed, although not illustrated, the upper sealing lip 24 is pushed outward and obliquely downward from the cabin by the vehicle body 100, and is elastically deformed to have its top end be positioned farther from the cabin than the base end is, and closely contacts the vehicle body 100. This configuration provides the upper sealing lip 24 with sealing properties. Examples of the vehicle body 100 include a body panel.

The glass run body 20 is provided with an interior sealing lip 25 at an upper part of its interior part. The interior sealing lip 25 projects obliquely upward to the exterior of the cabin, and is designed to be bent toward the exterior of the cabin, upon contact with the vehicle body 100. A base end of the interior sealing lip 25 is fixed to, and is integrated with, an interior part of the upper surface of the upper plate portion 21. When the interior sealing lip 25 is not in contact with the vehicle body 100, i.e., when the left front door 1 is open, the interior sealing lip 25 projects outward and obliquely upward from the cabin as illustrated in FIG. 2. When the interior sealing lip 25 is in contact with the vehicle body 100, i.e., when the left front door 1 is closed, although not illustrated, the interior sealing lip 25 is pushed outward and obliquely downward from the cabin by the vehicle body 100, and is elastically deformed to be close to the base end of the upper sealing lip 24, and closely contacts the vehicle body 100. This configuration provides the interior sealing lip 25 with sealing properties.

The upper plate portion 21 has, at its interior end, an interior sealing portion 26 projecting downward. The interior sealing portion 26 is fixed to, and is integrated with, an interior end of the upper plate portion 21. The interior sealing portion 26 has its lower end contacting the upper surface of the glass run mount 8.

The glass run body 20 further has, at a lower part of its exterior part, a lower sealing portion 27 projecting downward. A base end of the lower sealing portion 27 is fixed to, and is integrated with, an exterior part of the lower surface of the lower plate portion 22. The lower sealing portion 27 further has a lower portion bending toward the interior of the cabin. The lower portion of the lower sealing portion 27 contacts the exterior surface of a closed window glass 4.

The glass run body 20 further has, at a lower part of its interior part, a lower sealing portion 28 projecting downward. The lower sealing portion 28 has its base end fixed to, and integrated with, an interior end surface of the lower plate portion 22. The lower sealing portion 28 further has a lower portion bending toward the interior of the cabin. The lower portion of the lower sealing portion 28 contacts the outer panel 5 of the window frame 3. The lower sealing portion 28 further contacts an interior surface of the closed window glass 4.

The lower plate portion 22 has, on its lower surface, a middle sealing lip 29 located between the base end of the lower sealing portion 27 and the base end of the lower sealing portion 28. The middle sealing lip 29 has a base end fixed to, and integrated with, a middle portion of the lower surface of the lower plate portion 22 in the inward-outward direction of the cabin. The middle sealing lip 29 extends outward and obliquely downward from the cabin and contacts an upper end of the closed window glass 4.

The upper sealing lip 24, the interior sealing lip 25, the interior sealing portion 26, the lower sealing portion 27, the lower sealing portion 28, and the middle sealing lip 29 are integrated with members (the upper plate portion 21, the lower plate portion 22, and the exterior plate portion 23) formed of the above-described high-stiffness material by extrusion. This configuration ensures maintainability of the shapes in assembly even if they are formed of a material softer than the high-stiffness material and thus easy to be elastically deformed. For integration by extrusion, commonly known processes are used, and examples of the processes include: a process of forming the above sealing members by extrusion while forming the member formed of the above-described high-stiffness material by extrusion, and integrating them together using a well-known extrusion die; and a process of forming the member formed of the above-described high-stiffness material by extrusion in advance, and integrating the above various sealing members with the member using an extrusion die of an extruding machine. For example, the upper sealing lip 24, the interior sealing lip 25, the interior sealing portion 26, the lower sealing portion 27, the lower sealing portion 28, and the middle sealing lip 29 may be formed from: rubber having a main material of various polymers such as ethylene-propylene-diene rubber (EPDM); and an elastic material like various thermoplastic elastomers (TPEs) such as olefin thermoplastic elastomer (TPO), and styrenic thermoplastic elastomer (TPS). The rubber and TPEs may be a foamed material or a solid material. TPEs such as TPO are more preferable for use if hard resin such as polypropylene is used for the above-described high-stiffness material.

The upper sealing lip 24, the interior sealing lip 25, the interior sealing portion 26, the lower sealing portion 27, the lower sealing portion 28, and the middle sealing lip 29 form the glass run body 20 along with the upper plate portion 21, the lower plate portion 22, and the exterior plate portion 23.

The trim strip 30 illustrated in FIG. 1 is a member that is a part of the design of a vehicle and usually formed of a hard material such as stainless and aluminum. In this embodiment, the trim strip 30 is formed of a stainless plate member. The trim strip 30 has an elongated shape extending in the front-rear direction along the glass run body 20. The trim strip 30 has its front end located near the front end of the upper frame portion 3a of the window frame 3 and has its rear end located near the rear end of the upper frame portion 3a of the window frame 3.

Figure 3:
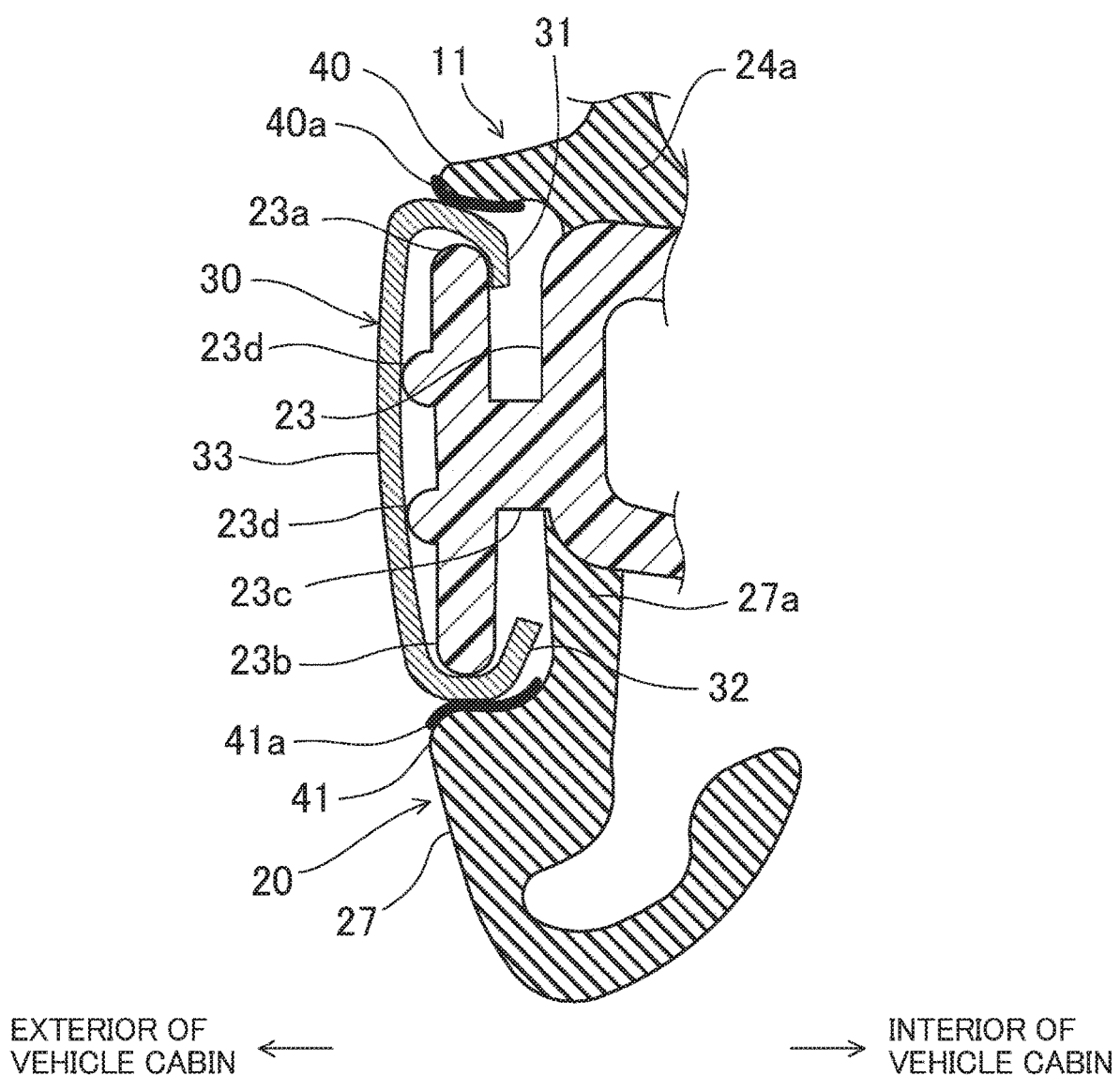
FIG. 3 is an enlarged view of A in FIG. 2.

As illustrated in FIG. 2 and FIG. 3, the trim strip 30 has, at its upper and lower parts, upper and lower trim-strip-side mating portions 31 and 32 mating with the exterior part of the glass run body 20 and extending in the front-rear direction. The upper trim-strip-side mating portion 31 is folded toward the interior of the cabin and is bent downward, and is open downward. The lower trim-strip-side mating portion 32 is folded toward the interior of the cabin and is bent upward, and is open upward. The trim strip 30 further has a design portion 33 between the upper and lower trim-strip-side mating portions 31 and 32. The design portion 33 is gently curved toward the exterior of the cabin.

The glass run body 20 has, at its exterior part, upper and lower body-side mating portions 23a and 23b extending in the front-rear direction and configured to mate with the upper and lower trim-strip-side mating portions 31 and 32. That is to say, the exterior plate portion 23 of the glass run body 20 has, at its exterior surface, a base portion 23c extending toward the exterior of the cabin. The base portion 23c is located near the vertical middle portion of the exterior surface of the exterior plate portion 23, and is continuous in the front-rear direction.

Figure 4:
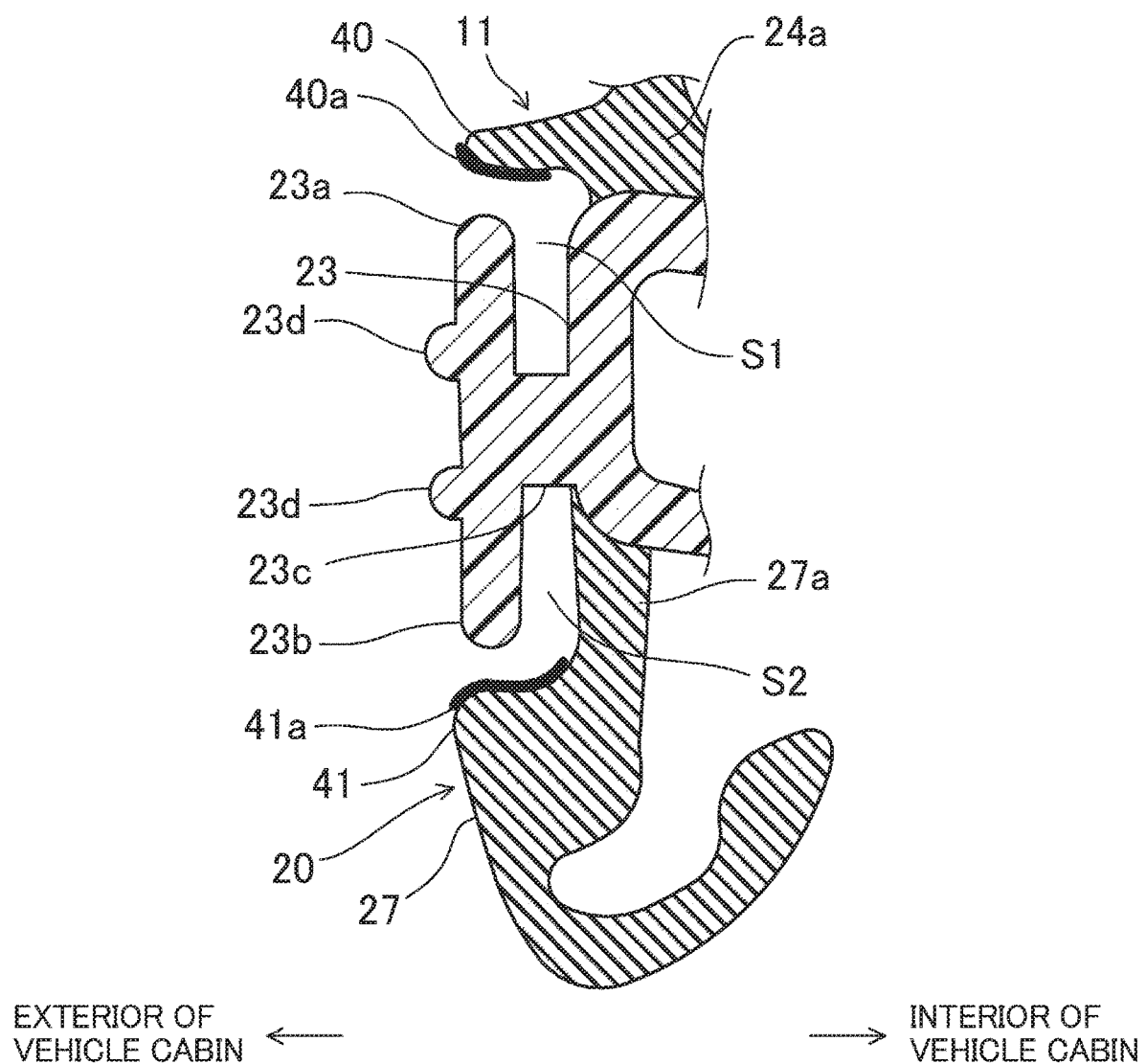
FIG. 4 is a view corresponding to FIG. 3 with a trim strip being not assembled.

As illustrated in FIG. 4, the upper body-side mating portion 23a is a plate-like portion projecting upward from a front end of the base portion 23c in the projecting direction and extending in the front-rear direction. A gap S1 larger than the thickness of a plate member used for the upper trim-strip-side mating portion 31 of the trim strip 30 is formed between the upper body-side mating portion 23a and the exterior surface of the exterior plate portion 23.

The lower body-side mating portion 23b is a plate-like portion projecting downward from the front end of the base portion 23c in the projecting direction and extending in the front-rear direction. A gap S2 larger than the thickness of a plate member used for the lower trim-strip-side mating portion 32 of the trim strip 30 is formed between the lower body-side mating portion 23b and the exterior surface of the exterior plate portion 23.

The upper and lower body-side mating portions 23a and 23b continuously extend from the front end to the rear end of the glass run body 20, and are formed in the shape of a rail to guide a trim strip 30, which will be described later, in the front-rear direction in assembling the trim strip 30.

As illustrated in FIG. 3, the upper trim-strip-side mating portion 31 of the trim strip 30 is designed to surround the upper body-side mating portion 23a of the glass run body 20 from above and to mate with the upper body-side mating portion 23a in this state. The lower trim strip-side mating portion 32 of the trim strip 30 is designed to surround the lower body-side mating portion 23b of the glass run body 20 from below and to mate with the lower body-side mating portion 23b in this state. When the upper and lower trim-strip-side mating portions 31 and 32 respectively mate with the upper and lower body-side mating portions 23a and 23b, the shapes of the upper and lower trim-strip-side mating portions 31 and 32 function to substantially prevent displacement of the trim strip 30 from the glass run body 20 in the inward-outward direction and the vertical direction of the cabin.

In this embodiment, the upper and lower body-side mating portions 23a and 23b are integrally formed with the exterior plate portion 23. This allows the upper body-side mating portion 23a and the lower body-side mating portion 23b to be formed of the high-stiffness material. This configuration can reduce accidental detachment of the trim strip 30 from the glass run body 20 with the upper and lower trim-strip-side mating portions 31 and 32 respectively mating with the upper and lower body-side mating portions 23a and 23b.

The glass run body 20 has, at its exterior part, an upper contacting portion 40 formed of an elastic material and configured to contact an upper part of the exterior surface of the trim strip 30. The upper contacting portion 40 projects outward from an exterior surface of a base end of the upper sealing lip 24. The upper contacting portion 40 and the upper sealing lip 24 are integrally formed together. The upper contacting portion 40 is tapered toward its front end (the exterior of the cabin) in the projecting direction, and continuously extends in the front-rear direction. The lower surface of the front end of the upper contacting portion 40 contacts the trim strip 30 from above, eliminating a gap between the upper part of the trim strip 30 and the upper part of the glass run body 20 to improve the appearance.

Furthermore, the upper contacting portion 40 and the upper sealing lip 24 are integrally formed together through a thick base end 24a. Upon elastic deformation of the upper sealing lip 24 in the inward-outward direction of the cabin, the upper contacting portion 40 is therefore slightly displaced based on the amount and the direction of deformation of the upper sealing lip 24. For example, as described above, the upper sealing lip 24 projects substantially straight upward when the left front door 1 is open. In this state, the position and the shape of the upper contacting portion 40 are determined such that the lower surface of the front end of the upper contacting portion 40 contacts the trim strip 30 from above. When the left front door 1 is closed, the upper sealing lip 24 is elastically deformed so as to be inclined outward and obliquely downward from the cabin. This deformation makes the upper contacting portion 40 slightly displaced outward and downward from the cabin through the thick base end 24a. The lower surface of the front end of the upper contacting portion 40 accordingly touches the trim strip 30 slightly harder from above, allowing the upper contacting portion 40 and the trim strip 30 to further closely contact each other.

The glass run body 20 has, at its exterior part, a lower contacting portion 41 located below and apart from the upper contacting portion 40. The lower contacting portion 41 is formed of an elastic material, and is designed to contact the lower part of the exterior surface of the trim strip 30. The lower contacting portion 41 bulges outward from the exterior surface of the lower sealing portion 27, and is integrally formed with the lower sealing portion 27. The lower contacting portion 41 continuously extends in the front-rear direction. The lower contacting portion 41 contacts the trim strip 30 from below, eliminating a gap between the lower part of the trim strip 30 and the lower part of the glass run body 20 to improve the appearance.

The lower contacting portion 41 and the lower sealing portion 27 are integrally formed together, and both extend downward from a base end 27a. Upon elastic deformation of the lower sealing portion 27, the lower contacting portion 41 is therefore displaced based on the amount and the direction of deformation of the lower sealing portion 27. For example, as described above, when the window glass 4 is closed, the lower sealing portion 27 contacts the exterior surface of the window glass 4, and may be elastically deformed toward the exterior of the cabin. The lower contacting portion 41 is accordingly displaced toward the exterior of the cabin, and touches the trim strip 30 hard from below, ensuring firm contact between the lower contacting portion 41 and the trim strip 30.

The glass run body 20 further has, at its exterior part, projections 23d projecting outward from the cabin and configured to contact an interior surface of the trim strip 30. The projection 23d contacts the interior surface of the trim strip 30, substantially preventing a wider area of the exterior plate portion 23 from contacting the trim strip 30. The projection 23d can be integrally formed with the exterior plate portion 23.

Coating for Reducing Sliding Resistance

In this embodiment, the trim strip 30 is assembled on the glass run body 20 by sliding the trim strip 30 along the glass run body 20 from an end in the longitudinal direction. This configuration can reduce the sliding resistance of the trim strip 30 in the assembly operation, and allows manual assembly of the trim strip 30 by a worker.

That is to say, the upper contacting portion 40 has a portion contacting the trim strip 30, and the portion is provided with an elastic upper coating 40a. The upper coating 40a has a sliding resistance to the trim strip 30 lower than an elastic material forming a covered portion of the upper contacting portion 40 by the upper coating 40a. More specifically, the covered portion of the upper contacting portion 40 by the upper coating 40a is formed of a similar elastic material to the upper sealing lip 24 and others, whereas the upper coating 40a is formed from a material fabricated by mixing silicone with olefin series resin and therefore having a kinetic friction coefficient lower than the similar elastic material to the upper sealing lip 24 and others. The upper coating 40a may be formed from another material other than the material fabricated by mixing silicone with olefin series resin.

The kinetic friction coefficient of the upper coating 40a is preferably 0.5 or less. The kinetic friction coefficient of the upper coating 40a can be changed as necessity by adjusting the amount of mixed silicone. The elastic material forming the covered portion of the upper contacting portion 40 by the upper coating 40a has a kinetic friction coefficient of about 0.6.

A method for measuring a kinetic friction coefficient will now be described. The method for measuring a kinetic friction coefficient described in Japanese Unexamined Patent Publication No. H09-123761 is applicable in this case, and the above-described kinetic friction coefficients are values obtained using this method. "HEIDON-14D" of SHINTO Scientific Co., ltd. was prepared as a surface texture measuring instrument, and the kinetic friction coefficients were measured using a sheet-metal shaped like watch glass. As illustrated in FIG. 3 of Japanese Unexamined Patent Publication No. H09-123761, a kinetic friction coefficient is measured by pressing the sheet-metal shaped like watch glass against the upper surface of a sample at a load of 1 kgf and relatively moving the sheet-metal shaped like watch glass and the sample at a speed of 1000 mm/min.

The upper coating 40a is set to have a thickness ranging from 0.005 mm to 0.5 mm. The thickness of the upper coating 40a of equal to or more than 0.005 mm can sufficiently reduce the sliding resistance to the trim strip 30. The thickness of the upper coating 40a of equal to or less than 0.5 mm can reduce a decrease in flexibility of the upper contacting portion 40 due to the presence of the upper coating 40a. The thickness of the upper coating 40a is more preferably 0.01 mm or more and 0.2 mm or less, and still more preferably 0.03 mm or more and 0.1 mm or less. This can sufficiently reduce the sliding resistance while maintaining the flexibility of the upper contacting portion 40. The upper coating 40a can be integrally formed with the upper contacting portion 40 by extrusion in forming the upper contacting portion 40. The integrally formation by extrusion can accurately control the thickness of the upper coating 40a. The upper coating 40a may be formed by attaching a sheet or coating using spray or a brush not by extrusion.

The lower contacting portion 41 has a portion contacting the trim strip 30, and the portion is provided with a lower coating 41a. The lower coating 41a has a kinetic friction coefficient to the trim strip 30 lower than an elastic material forming a covered portion of the lower contacting portion 41 by the lower coating 41a. The lower coating 41a can be formed from the same material as the material used for the upper coating 40a, and have the same thickness as the upper coating 40a. The lower contacting portion 41 is also formed using the same or similar method to the method of forming the upper contacting portion 40.

Method for Assembling Vehicle Door Glass Run

The left front door glass run 10 configured as above is assembled by the following method. A portion (the upper glass run portion 11) of the glass run body 20 designed to extend along the upper frame portion 3a is originally linear before the glass run body 20 is mounted on the window frame 3. The trim strip 30 is preliminarily curvedly formed to fit along the upper frame portion 3a of the window frame 3.

In the sliding assembly process, the glass run body 20 is assembled by respectively mating one ends of the upper and lower body-side mating portions 23a and 23b of the glass run body 20 in the longitudinal direction with one ends of the upper and lower trim-strip-side mating portions 31 and 32 of the trim strip 30 in the longitudinal direction, and then, sliding the glass run body 20 along the trim strip 30 in the longitudinal direction.

In the sliding assembly process, first, rear ends of the upper and lower body-side mating portions 23a and 23b of the glass run body 20 are allowed to respectively mate with front ends of the upper and lower trim-strip-side mating portions 31 and 32 of the trim strip 30. After the upper and lower body-side mating portions 23a and 23b respectively mate with the upper and lower trim-strip-side mating portions 31 and 32, the glass run body 20 is slid along the trim strip 30 toward the rear side. As described above, because the trim strip 30 is curved whereas the upper glass run portion 11 of the glass run body 20 is linear, the upper contacting portion 40 of the sliding glass run body 20 particularly tightly contacts the upper trim-strip-side mating portion 31 of the trim strip 30. In addition, the lower contacting portion 41 of the glass run body 20 may contact the lower trim-strip-side mating portion 32 of the trim strip 30.

In this step, the upper contacting portion 40 has the portion contacting the trim strip 30, and the portion is covered by the upper coating 40a having a lower kinetic friction coefficient to the trim strip 30 than the upper contacting portion 40. This reduces the sliding resistance between the upper part of the trim strip 30 and the upper contacting portion 40. Likewise, the lower contacting portion 41 has the portion contacting the trim strip 30, and the portion is covered by the lower coating 41a having a lower kinetic friction coefficient to the trim strip 30 than the lower contacting portion 41. This reduces the sliding resistance between the lower part of the trim strip 30 and the lower contacting portion 41. This configuration facilitates manual assembly of the glass run body 20 on the trim strip 30 by a worker and thus makes it unnecessary to introduce any machine for trim strip assembly. The sliding operation ends when the front end of the upper glass run portion 11 of the glass run body 20 reaches the front end of the trim strip 30. In this manner, the glass run body 20 is assembled on the trim strip 30, thereby completing assembly operation of the left front door glass run 10.

With the trim strip 30 curved upward, the upper part of the trim strip 30 tightly contacts the glass run body 20 compared to the lower part of the trim strip 30. Because of this configuration, the glass run body 20 only has to include the upper coating 40a and may exclude the lower coating 41a.

In the sliding assembly process, the glass run body 20 is slid along the trim strip 30. Conversely, the trim strip 30 may be slid along the glass run body 20.

For Use of Vehicle Door Glass Run

For mounting the left front door glass run 10 to the left front door 1, the left front door glass run 10 is mounted on the glass run mount 8 of the window frame 3 with the upper engaging projections 21a of the upper plate portion 21 and the lower engaging projections 22a of the lower plate portion 22 respectively contacting the upper surface and the lower surface of the glass run mount 8. In this state with the left front door glass run 10 mounted, the upper plate portion 21, the lower plate portion 22, and the exterior plate portion 23 each have a flexural modulus ranging from 2000 MPa to 5000 MPa. This structure can increase the anchoring strength of the glass run body 20 to the glass run mount 8.

Thereafter, when the left front door 1 is closed, the upper sealing lip 24 and the interior sealing lip 25 of the glass run body 20 contact the vehicle body 100 and are elastically deformed so as to bend toward the exterior of the cabin, thereby sealing between the window frame 3 and the vehicle body 100. Upon deformation by bending of the upper sealing lip 24, the upper contacting portion 40, which is provided to the exterior part of the thick base end 24a of the upper sealing lip 24, is slightly displaced toward the exterior of the cabin, and further closely contacts the upper part of the exterior surface of the trim strip 30. This structure can eliminate a gap between the upper contacting portion 40 and the trim strip 30 to improve the appearance.

Second Embodiment

Figure 5:
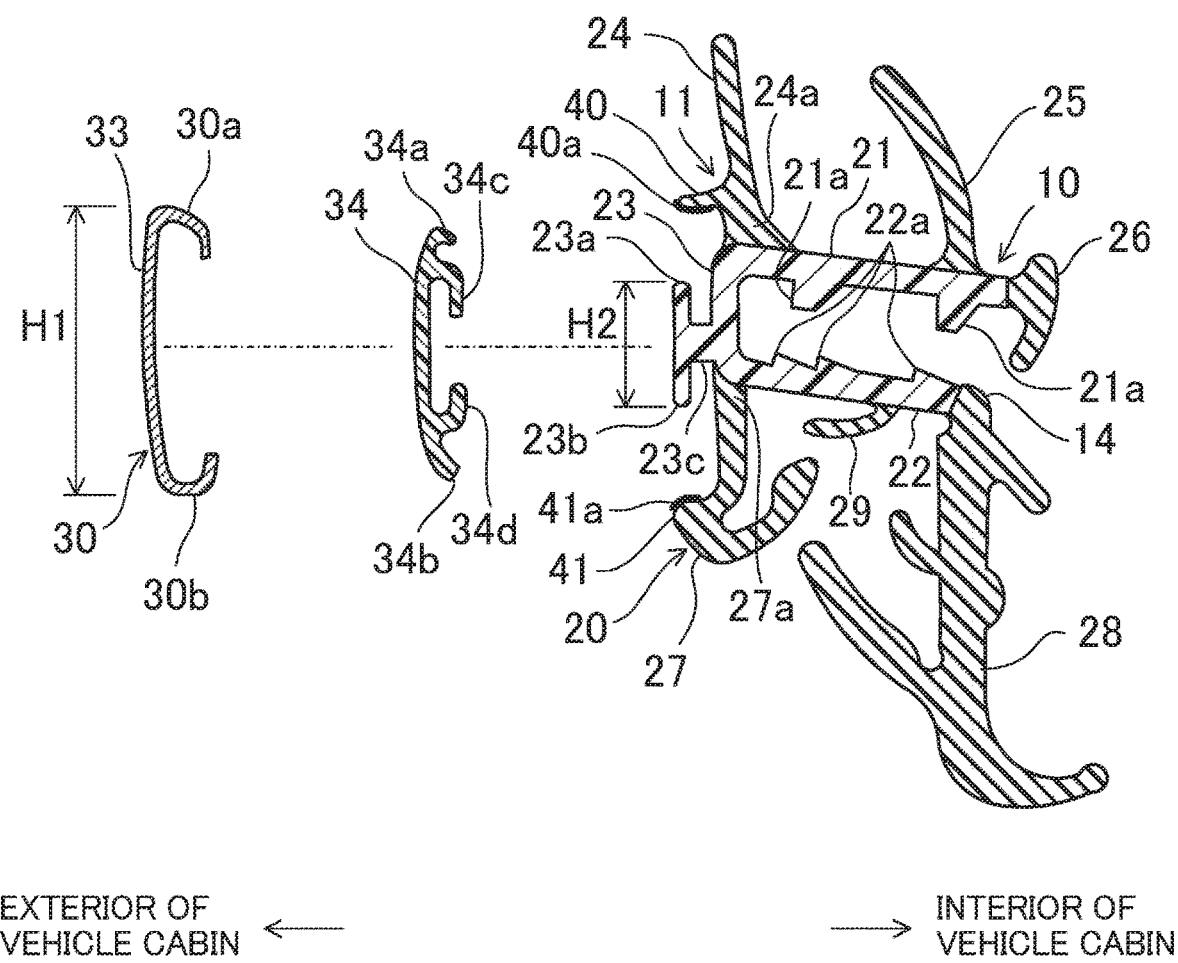
FIG. 5 is an exploded view according to a second embodiment of the present disclosure.
Figure 6:
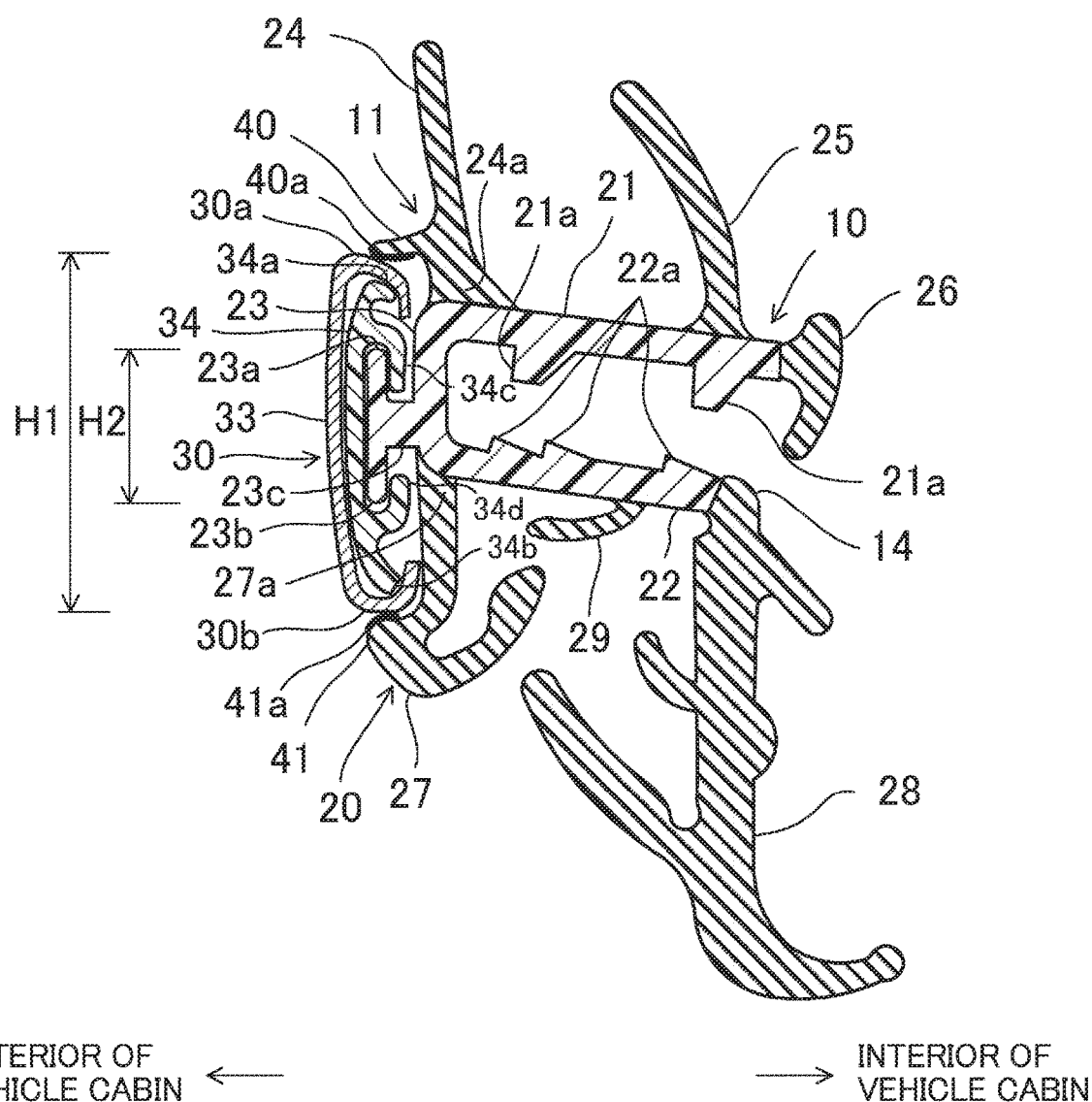
FIG. 6 corresponds to FIG. 4 according to the second embodiment.

FIGS. 5 and 6 relate to a second embodiment of the present disclosure. In the second embodiment, the configuration for assembly of the trim strip 30 is different from that of the first embodiment. In the following description, components that have been described in the first embodiment are designated by the same reference characters, and are not described in detail. The following description will focus on only differences from the first embodiment.

The trim strip 30 in the second embodiment has a larger vertical dimension H1 than the trim strip 30 in the first embodiment. Such a larger vertical dimension H1 of the trim strip 30 requires a larger vertical dimension H2 between the upper body-side mating portion 23a and the lower body-side mating portion 23b. However, because these portions are formed of a high-stiffness material, the larger vertical dimension H2 between the upper body-side mating portion 23a and the lower body-side mating portion 23b makes it difficult to deform the glass run body 20 in a manner fitting the shape of the window frame 3 in mounting the left front door glass run 10 on the left front door 1.

The trim strip 30 in the second embodiment is therefore provided with a separate resin member 34 to increase the vertical dimension H1 of the trim strip 30 while decreasing the dimension H2 between the upper body-side mating portion 23a and the lower body-side mating portion 23b. The resin member 34 is a member constituting a part of the trim strip 30 and extending long in the front-rear direction along a body portion (a metal portion) of the trim strip 30. The resin member 34 can be formed of a material having lower stiffness than the upper plate portion 21, the lower plate portion 22, and the exterior plate portion 23.

A body of the trim strip 30 has, at its upper part, an upper bending portion 30a bending toward the interior of the cabin, and further has, at its lower part, a lower bending portion 30b bending toward the interior of the cabin.

The resin member 34 has, at its upper part, an upper projecting portion 34a fitted into the upper bending portion 30a and further has, at its lower part, a lower projecting portion 34b fitted into the lower bending portion 30b. The resin member 34 is fixed to the body of the trim strip 30 with the upper projecting portion 34a and the lower projecting portion 34b respectively fitted into the upper bending portion 30a and the lower bending portion 30b.

The resin member 34 has, at an upper part of its interior part, an upper trim-strip-side mating portion 34c and further has, at a lower part of its interior part, a lower trim-strip-side mating portion 34d. The upper and lower trim-strip-side mating portion 34c and 34d extends in the front-rear direction, and configured to mate with the exterior part of the glass run body 20. As illustrated in FIG. 6, the upper and lower trim-strip-side mating portions 34c and 34d respectively mate with the upper and lower body-side mating portions 23a and 23b of the glass run body 20. The vertical dimension between the upper trim-strip-side mating portion 34c and the lower trim-strip-side mating portion 34d is smaller than the vertical dimension between the upper bending portion 30a and the lower bending portion 30b.

In the second embodiment, the resin member 34 is first assembled on the body of the trim strip 30, and then, the trim strip 30 can be assembled on the glass run body 20. In this process, the upper and lower coatings 40a and 41a of the glass run body 20 respectively contact the upper and lower parts of the body of the trim strip 30. Accordingly, the second embodiment can also obtain the same or similar advantages as to the first embodiment.

Third Embodiment

Figure 7:
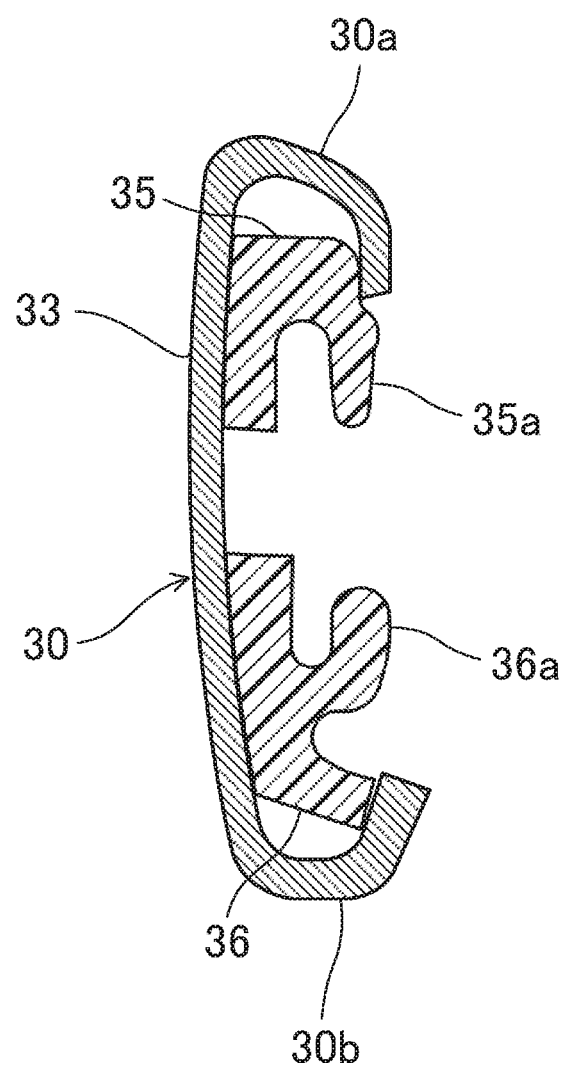
FIG. 7 is a sectional view of a trim strip according to a third embodiment of the present disclosure.

FIG. 7 relates to a third embodiment of the present disclosure. In the third embodiment, the configuration for assembly of the trim strip 30 is different from that of the first embodiment. In the following description, components that have been described in the first embodiment are designated by the same reference characters, and are not described in detail. The following description will focus on only differences from the first embodiment.

For the same reason as the second embodiment, the trim strip 30 in the third embodiment has an upper resin member 35 and a lower resin member 36 extending in the front-rear direction. A body of the trim strip 30 has, at its upper part, an upper bending portion 30a bending toward the interior of the cabin, and further has, at its lower part, a lower bending portion 30b bending toward the interior of the cabin.

The upper resin member 35 is designed to be fitted into the upper bending portion 30a of the body of the trim strip 30. The lower resin member 36 is designed to be fitted into the lower bending portion 30b of the body of the trim strip 30. The upper resin member 35 has, at its interior part, an upper trim-strip-side mating portion 35a extending in the front-rear direction and configured to mate with the exterior part of the glass run body 20. The lower resin member 36 has, at its interior part, an lower trim-strip-side mating portion 36a extending in the front-rear direction and configured to mate with the exterior part of the glass run body 20. The upper trim-strip-side mate portion 35a and the lower trim strip-side mating portion 36a respectively mate with the upper body-side mating portion 23a and the lower body-side mating portion 23b of the glass run body 20.

In the third embodiment, the upper resin member 35 and the lower resin member 36 are first assembled on the body of the trim strip 30, and the trim strip 30 is assembled on the glass run body 20. In this process, the upper and lower coatings 40a and 41a respectively contact the upper and the lower parts of the body of the trim strip 30. Accordingly, the third embodiment can also obtain the same or similar advantages as to the first embodiment.

The embodiments described above are a mere example in every respect, and shall not be interpreted in a limited manner. Any modification and change equivalent to the scope of claims fall within the scope of the present disclosure.

As can be seen from the foregoing description, the present disclosure is applicable to a glass run disposed in a window frame of a vehicle door.

What is claimed is:

1. A vehicle door glass run, which is mounted on a window frame extending in a manner defining a window opening of a vehicle door from an exterior of a cabin, and seals between the window frame and a window glass, the vehicle door glass run comprising:
    a glass run body having an insertion groove into which a glass run mount extending outward from an upper part of the window frame is inserted; and a trim strip assembled on an exterior part of the glass run body and extending in a front-rear direction of a vehicle, wherein
    upper and lower parts of the trim strip are respectively provided with upper and lower trim-strip-side mating portions extending in a front-rear direction of the vehicle and configured to mate with the exterior part of the glass run body,
    the exterior part of the glass run body is provided with body-side mating portions and an upper contacting portion, the body-side mating portions extending in the front-rear direction of the vehicle and being configured to mate with the upper and lower trim-strip-side mating portions, the upper contacting portion being formed of an elastic material and being configured to contact the upper trim-strip-side mating portion of the trim strip, and
    the upper contacting portion has a portion contacting the trim strip and provided with a coating, and the coating has a kinetic friction coefficient, to the trim strip, lower than an elastic material forming a covered portion of the upper contacting portion by the coating.

2. The vehicle door glass run of claim 1, wherein
    an upper part of the exterior part of the glass run body is provided with an upper sealing lip projecting upward and configured to be bent outward and obliquely downward from the cabin upon contact with a vehicle body, and
    the upper sealing lip has a base end having an exterior part provided with the upper contacting portion projecting outward.

3. The vehicle door glass run of claim 1, wherein
    the exterior part of the glass run body is provided with a lower contacting portion located below, and apart from, the upper contacting portion, the lower contacting portion being formed of an elastic material and being configured to contact the lower trim-strip-side mating portion of the trim strip, and
    the lower contacting portion has a portion contacting the trim strip and provided with a coating, and the coating has a kinetic friction coefficient, to the trim strip, lower than an elastic material forming a covered portion of the lower contacting portion by the coating.

4. The vehicle door glass run of claim 1, wherein
    the coating has a thickness of equal to or greater than 0.005 mm and equal to or smaller than 0.5 mm.

5. The vehicle door glass run of claim 1, wherein
    the glass run body includes an upper plate portion extending along an upper surface of the glass run mount, a lower plate portion extending along a lower surface of the glass run mount, and an exterior plate portion extending from an exterior end of the upper plate portion to an exterior end of the lower plate portion, the insertion groove being formed between the upper plate portion and the lower plate portion, and
    the upper plate portion, the lower plate portion, and the exterior plate portion are formed of a high-stiffness material having a flexural modulus ranging from 2000 MPa to 5000 MPa.

6. The vehicle door glass run of claim 5, wherein
    the body-side mating portion is integrally formed with the exterior plate portion.

7. The vehicle door glass run of claim 1, wherein
    the coating has a kinetic friction coefficient, to the trim strip, of 0.5 or less.

8. The vehicle door glass run of claim 1, wherein
    the exterior part of the glass run body is provided with a projection projecting toward the exterior of the cabin and configured to contact an interior surface of the trim strip.

9. A method of assembling a vehicle door glass run, which is mounted on a window frame extending in a manner defining a window opening of a vehicle door from an exterior of a cabin, and seals between the window frame and a window glass, the method comprising:
    preparing a glass run body having an insertion groove into which a glass run mount extending outward from an upper part of the window frame is inserted, and a trim strip assembled on an exterior part of the glass run body and extending in a front-rear direction of a vehicle;
    providing upper and lower parts of the trim strip with upper and lower trim-strip-side mating portions extending in a front-rear direction of the vehicle and configured to mate with the exterior part of the glass run body;
    providing the exterior part of the glass run body with body-side mating portions extending in the front-rear direction of the vehicle and configured to mate with the upper and lower trim-strip-side mating portions, providing the exterior part of the glass run body with an upper contacting portion formed of an elastic material and configured to contact the upper trim-strip-side mating portion of the trim strip, and providing the upper contacting portion with a portion contacting the trim strip and providing the portion with a coating;
    having the coating have a kinetic friction coefficient, to the trim strip, lower than an elastic material forming a covered portion of the upper contacting portion by the coating; and
    assembling the trim strip on the glass run body by mating the upper and lower trim-strip-side mating portions of the trim strip, from one ends of the upper and lower trim-strip-side mating portions of the trim strip, in a longitudinal direction, with one ends of the body-side mating portions of the glass run body in the longitudinal direction, and then, sliding the trim strip along the glass run body in the longitudinal direction.

10. The method of claim 9, wherein
    the trim strip is preliminarily curvedly shaped to fit a shape of the upper part of the window frame, and the glass run body is preliminarily linearly shaped, and then, the assembling is performed.

* * * * *